US011169245B2

(12) United States Patent
Glass et al.

(10) Patent No.: US 11,169,245 B2
(45) Date of Patent: Nov. 9, 2021

(54) METHOD AND SYSTEM FOR SIMULATING A TARGET (71) Applicant: ELBIT SYSTEMS EW AND SIGINT-ELISRA LTD, Holon (IL)

(72) Inventors: Roy Glass, Holon (IL); Reuel Manela, Holon (IL)

(73) Assignee: ELBIT SYSTEMS EW AND SIGINT-ELISRA LTD, Holon (IL)

( * ) Notice: Subject to any disclaimer, the term of this patent is extended or adjusted under 35 U.S.C. 154(b) by 0 days.

(21) Appl. No.: 16/617,181

(22) PCT Filed: May 29, 2018

(86) PCT No.: PCT/IL2018/050587
§ 371 (c)(1),
(2) Date: Nov. 26, 2019

(87) PCT Pub. No.: WO2018/220629
PCT Pub. Date: Dec. 6, 2018

(65) Prior Publication Data
US 2020/0371206 A1    Nov. 26, 2020

(30) Foreign Application Priority Data

Jun. 1, 2017  (IL) ........................................ 252661

(51) Int. Cl.
*G01S 7/40* (2006.01)
*G05D 1/10* (2006.01)

(52) U.S. Cl.
CPC ............ *G01S 7/4052* (2013.01); *G05D 1/101* (2013.01); *G01S 7/4082* (2021.05)

(58) Field of Classification Search
CPC ..................................................... G01S 7/4052
(Continued)

(56) References Cited

U.S. PATENT DOCUMENTS 5,351,054 A    9/1994  Fredericks et al.
5,457,463 A *  10/1995 Vencel ................. G01S 7/4052
342/169

(Continued)

FOREIGN PATENT DOCUMENTS

EP    3296760 A1   3/2018
EP    3508870      7/2019
(Continued)

OTHER PUBLICATIONS

Taniza Roy et al. "Design of Multilevel Radar Target Simulator" 1-4244-0284-0/07/$20.OO, IEEE: 203-208 (2007).
(Continued)

Primary Examiner — Erin F Heard
Assistant Examiner — Helena H Seraydaryan
(74) Attorney, Agent, or Firm — Merchant & Gould P.C.

(57) ABSTRACT

A method for simulating a trajectory of a radar target includes the procedures of determining a simulated trajectory of the simulated target and determining a simulating vehicle trajectory for a simulating vehicle. The simulating vehicle trajectory is defined according to a simulation profile. The simulation profile at least includes a spatial simulation profile and a signal delay profile. The method further includes the procedures of maneuvering the simulating vehicle according the spatial simulation profile, receiving a radar signal by the simulating vehicle and retransmitting a signal toward the radar at least according to the signal delay profile.

14 Claims, 11 Drawing Sheets (58) Field of Classification Search
USPC .......................................................... 342/171
See application file for complete search history.

(56) References Cited

U.S. PATENT DOCUMENTS

| | | | |
|---|---|---|---|
| 7,852,260 B2 | 12/2010 | Sarafian | |
| 2008/0018525 A1 | 1/2008 | Svy et al. | |
| 2011/0210884 A1 | 9/2011 | Jennings et al. | |
| 2015/0369905 A1* | 12/2015 | Shipley | G01S 7/4052 342/171 |
| 2016/0377702 A1 | 12/2016 | Yomo et al. | |
| 2019/0137603 A1* | 5/2019 | Peacock | G01S 7/4052 |

FOREIGN PATENT DOCUMENTS

| | | | | |
|---|---|---|---|---|
| JP | 2010-159998 A | 7/2010 | | |
| JP | 2014-132977 A | 7/2014 | | |
| JP | 2017-021026 A | 1/2017 | | |
| WO | WO-2018011077 A1 * | 1/2018 | ........... | G01S 7/4052 |
| WO | WO2018011077 A1 | 1/2018 | | |

OTHER PUBLICATIONS

"SkyRadar, Modular Radar Training System, CW, Pulse, Doppler, Security, Target Positioning System, Scops" Catalog: SkyRadar CW 5.0—the catalog describes the product release 5.0 (2014).
International Search Report for PCT/IL2018/050587, dated Apr. 30, 2018.
Written Opinion for PCT/IL2018/050587, dated Sep. 3, 2018.
Dr. R. Lefevre et al., "Smart Repeater for Radar Testing," 1998 IEEE AUTOTESTCON Proceedings. IEEE Systems Readiness Technology Conference. Test Technology for the 21st Century (Cat. No. 98CH36179): 611-614 (1998).
Office Action for Japanese Patent Application No. 2019-566620, dated Dec. 8, 2020.
Office action dated Jul. 7, 2020 for corresponding JP application No. 2019-566620.
EESR issued Feb. 1, 2021 for corresponding EP application No. 18810719.7 (9p.).

* cited by examiner

METHOD AND SYSTEM FOR SIMULATING A TARGET

This application is a National Stage application of PCT/IL2018/050587, filed May 29, 2018, which claims priority to Israeli Patent Application No. 252661, filed Jun. 1, 2017, which applications are incorporated herein by reference. To the extent appropriate, a claim of priority is made to each of the above-disclosed applications.

FIELD OF THE DISCLOSED TECHNIQUE

The disclosed technique relates to radars in general, and to methods and systems for simulating targets in particular.

BACKGROUND OF THE DISCLOSED TECHNIQUE

Figure 1:
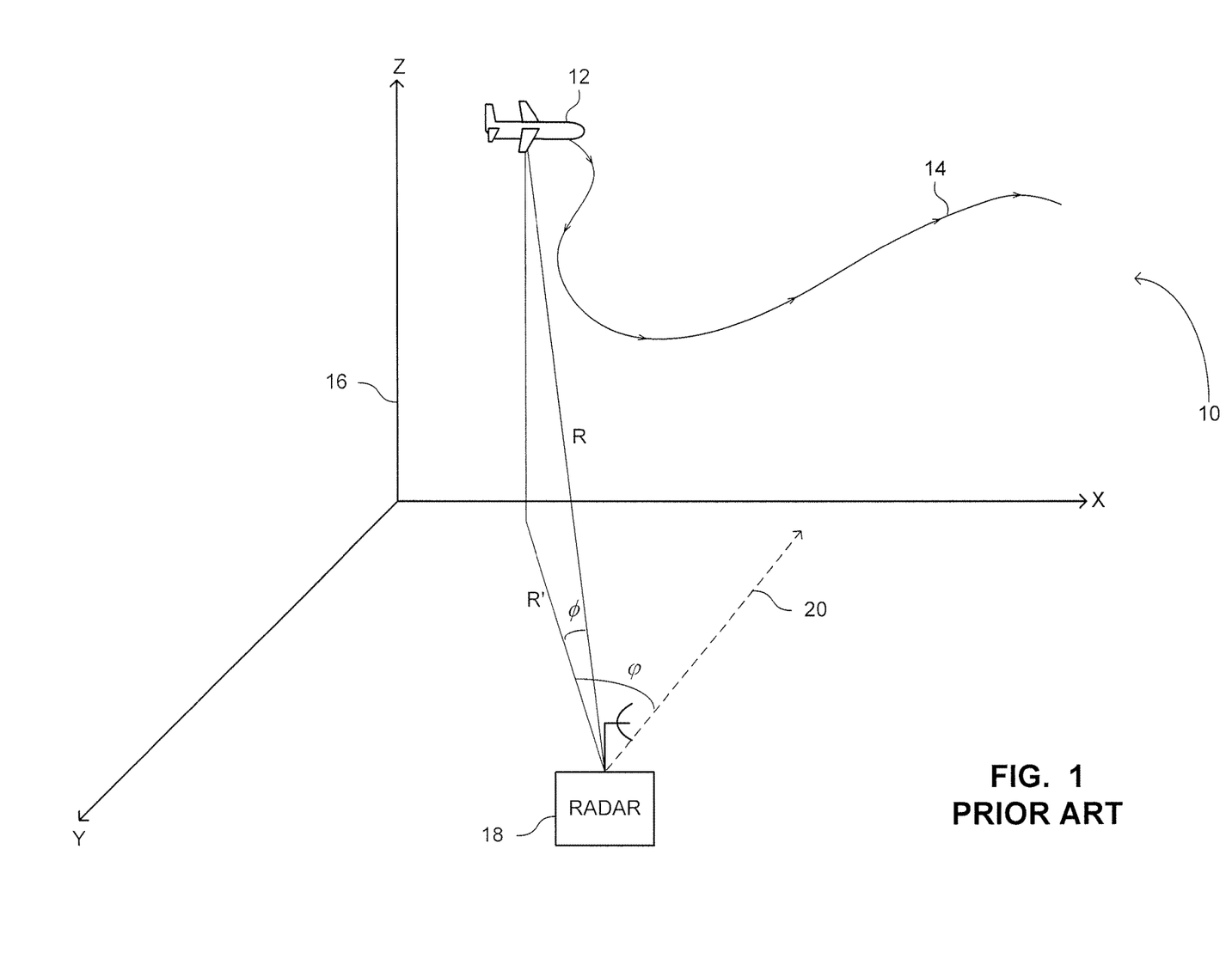
FIG. 1 is a schematic illustration of a scenario which is known in the art, of a vehicle, such as an aircraft, moving along a trajectory.

Radars are known in the art and are employed to detect targets and provide information relating to the position thereof. Reference is now made to FIG. 1, which is a schematic illustration of a scenario generally reference 10 which is known in the art, of a vehicle 12, such as an aircraft, moving along a trajectory 14. Trajectory 14 may be defined within a three-dimensional (3D) coordinate system 16. The term 'trajectory' relates herein at least to a path of aircraft 12, the velocities and accelerations of aircraft 12 over time. A radar 18 located on the ground (e.g., the XY plane of coordinate system 16) detects aircraft 12 and provides information relating to the position of aircraft 12. Typically, radar 18 provides the information relating to the position of aircraft 12 in terms of an azimuth, φ, relative to a reference direction 20 (e.g., the north), an elevation, ϕ, relative to a reference plane (e.g., the XY plane of coordinate system 16) and the range, R, from radar 18. The projection of the range, R, on the XY plane of coordinate system 16 is referred to herein as R'.

Training a radar operator or calibrating a radar requires simulating a target. Known in the art techniques for simulating a target of a radar such as radar 18 includes moving a mock vehicle (e.g., a drone, a pulled glider) in the actual trajectory being simulated. Alternatively, a stationary transceiver or transceivers are place around the radar at known locations relative to the radar. Such a transceiver receives the radar signal, delays the signal at a delay corresponding to the distance of the simulated target from the radar and transmits the delayed signal.

According to another known in the art technique, an RF target simulator is connected instead of the radar antenna. Such a RF target simulator receives from the radar transmitter the transmitted radar signal as well as the radar beam direction. The RF target simulator generates an RF signal simulating a return signal from a target at a simulated direction and distance. The radar receiver receives this simulated RF signal and displays a representation of the target on the radar display. According to a further known in the art technique for training a radar operator is generating a computer simulation of targets on a displays U.S. Pat. No. 7,852,260 to Sarafian entitled "Methods and Systems for Generating Virtual Radar Targets" directs to a system and method which employs reflections from a radome encasing the radar antenna. The system directed to by Sarafian, includes a transceiver, located within the radome, which receives reflections from the radome. The transceiver re-transmits a signal toward the radome, at a delay corresponding to the simulated distance. The re-transmitted signal is reflected from the radome back toward the radar antenna.

U.S. Patent Application Publication 2015/0369905 to Shipley, directs to a target simulation device which includes a vertical antenna array positioned on or near a radar. The simulation device transmits signals, in response to received signals from the radar, that simulate a reflection signal of one or more targets of particular azimuths, elevations and distances. The simulation device can be rotated about the radar to simulate the azimuth of a target. The simulation device controls transmission from the vertical antenna array to simulating the elevation of the target, based on the received signal from the radar. The simulation device controls the delay of the transmitted signal to simulate the distance of the target.

SUMMARY OF THE PRESENT DISCLOSED TECHNIQUE

It is an object of the disclosed technique to provide a novel method and system for simulating a trajectory of a radar target. In accordance with the disclosed technique, there is thus provided a method for simulating a trajectory of a radar target. The method includes the procedures of determining a simulated trajectory of the simulated target and determining a simulating vehicle trajectory for a simulating vehicle. The simulating vehicle trajectory is defined according to a simulation profile. The simulation profile at least includes a spatial simulation profile and a signal delay profile. The spatial simulation profile includes an azimuth simulation profile and an elevation simulation profile. The method further includes the procedures of maneuvering the simulating vehicle according the spatial simulation profile, receiving a radar signal by the simulating vehicle and re-transmitting a signal toward the radar at least according to the signal delay profile.

In accordance with another aspect of the disclosed technique, there is thus provided a system for simulating a trajectory of a radar simulated target. The system includes a simulating vehicle which includes a receiving transducer, a receiver, a position detector, a transmitter, a transmitting transducer and a processor. The processor at least includes a signal delay and is coupled with the receiver and with the transmitter. The receiver is further coupled with the receiving transducer and the transmitter is further coupled with the transmitting transducer. The receiving transducer receives signals from the radar and transforms the received signal to an electric received signal. The receiver receives the electric received signal and at least samples the electric received signal to produce a sampled received signal. The position detector determines the current position of the simulating vehicle. The transmitter converts a re-transmission signal to an analog signal. The transmitting transducer transforms the analog signal into a transmitted signal. The processor receives the sampled received signal and produces the re-transmission signal at a delay defined by a signal delay profile. The processor further determines motion characteristics of the simulating vehicle according to a spatial simulation profile and the current position of the simulating vehicle. The spatial simulation profile defines the trajectory of the simulating vehicle. The spatial simulation profile includes an azimuth simulation profile and an elevation simulation profile.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and a method for simulating a trajectory of a simulated target for radar operator training, radar calibration and/or testing. According to the disclosed technique, a simulating vehicle (e.g., an unmanned vehicle such as a remote controlled drone) maneuvers according to a simulating vehicle trajectory, which simulate an actual trajectory of a target. The simulating vehicle trajectory is defined according to a simulation profile. The simulation profile at least includes a spatial simulation profile, a signal delay profile and may further include a signal characteristics profile (e.g., signal amplitude, Doppler shift and the like). The spatial simulation profile defines the trajectory of the simulating vehicle in space. The spatial trajectory profile includes, for example, at least one of an azimuth simulation profile and an elevation simulation profile. The azimuth simulation profile defines an azimuthal trajectory for the simulating vehicle. The elevation simulation profile defines an elevation trajectory for the simulating vehicle. The spatial simulation profile may alternatively include a list of coordinates and elevations in a reference coordinate system. The signal delay profile defines the delays employed before re-transmitting a received radar signal, thus simulating the distance of the target. The signal characteristics profile defines the signal characteristics of the re-transmitted signal. It is noted that the term 'distance' and the term 'range' are employed herein interchangeably.

According to the disclosed technique, the simulating vehicle maneuvers within the "radar blind zone". The term "radar blind zone" relates to a space around the radar where the radar does not detect targets. For example, the radar blind zone relates to the distance from the radar defined according to the duration in which the radar transmits a signal and does not receive signals, times the propagation speed of the signal in the medium (e.g., air, free space, water). This duration, in which the radar transmits a signal and does not receive signals, times the propagation speed of the signal in the medium defines a sphere around the radar in which the radar does not detect objects. This sphere is the radar blind zone. The radar blind zone is also referred to herein as the radar minimum detection range. It is noted that the simulating vehicle may operate outside the radar blind zone. However, this may result in a representation of the simulating vehicle appearing on the radar. Such a representation should typically be accounted for when training, calibrating and/or testing the radar (e.g., ignored or employed as an additional target).

For the purpose of the explanations brought forth herein, the simulating vehicle is exemplified as a drone and the simulating vehicle trajectory is defined at least according to a spatial simulation profile and signal delay. However, it is noted that the simulated target may be any land, air or sea vehicle (e.g., a car, an air plane, a ship and the like) and the simulating vehicle may be a corresponding unmanned vehicle (e.g., a remote controlled drone, a remote controlled car, a remote controlled boat and the like). Furthermore, the spatial simulation profile includes at least one of an azimuth simulation profile and an elevation simulation profile. The simulating vehicle trajectory may include any combination of at least one of an azimuthal simulation trajectory, elevation simulation trajectory and signal delay characteristics. For example, when simulating a vessel, only an azimuthal simulation trajectory and simulation delays are required to define a simulating vehicle trajectory (i.e., elevation profile is regarded as including only a constant value). For simulating a vehicle moving on a straight line toward and away from the radar, only simulation delays are required (i.e., the azimuth and elevation profiles are regarded as including only respective single constant values). Furthermore, the term 'radar' employed herein relates to a system that determines the range and direction of an object according to Time-Of-Flight of a return signal which, the signal being, for example, Radio Frequency (RF) signals, Sonic (e.g., Ultrasound or Sonar) signals or light signals.

Figure 2A:
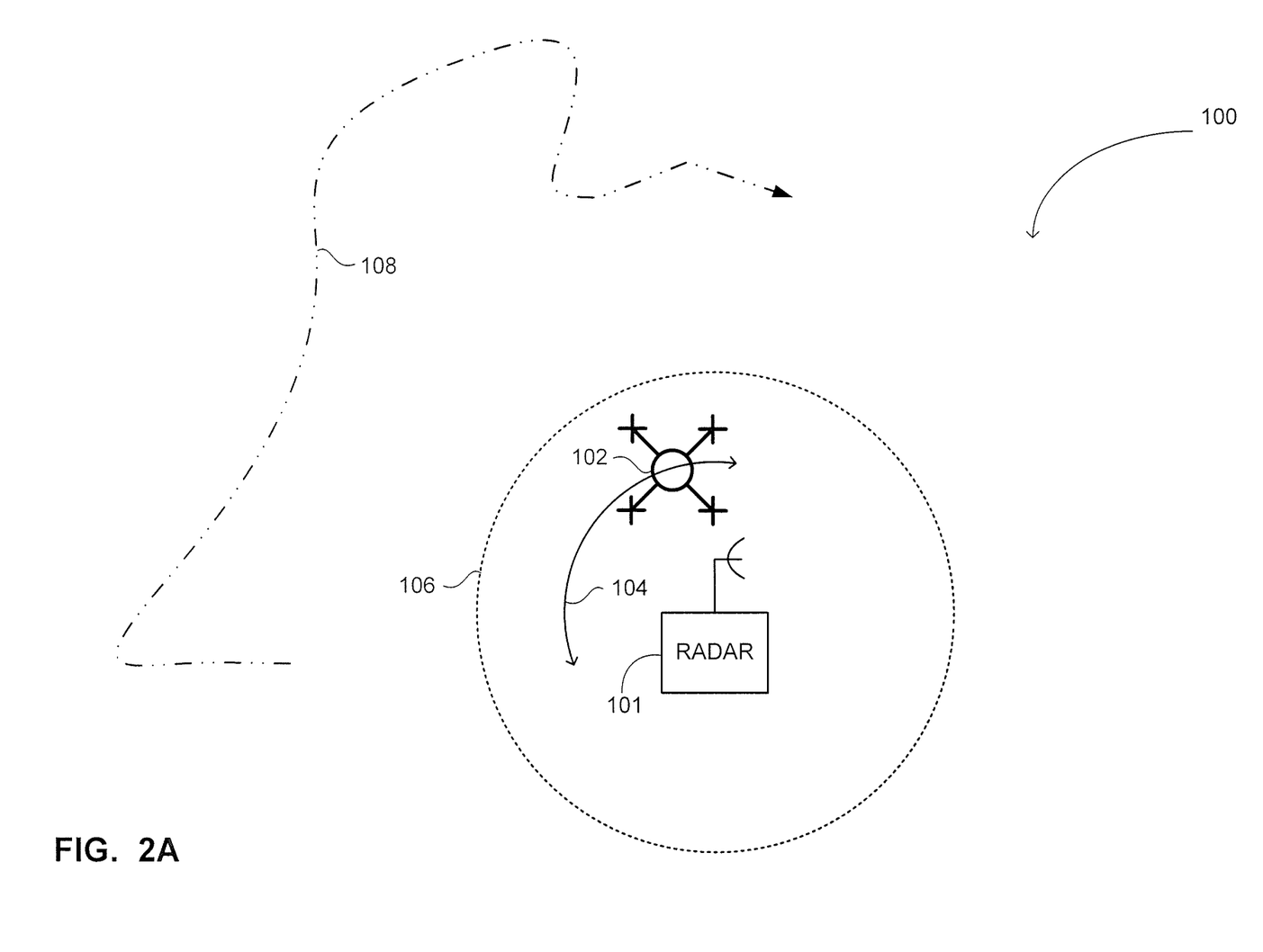
FIGS. 2A-2D are schematic illustrations of a simulating vehicle trajectory, in accordance with an embodiment of the disclosed technique.
Figure 2B:
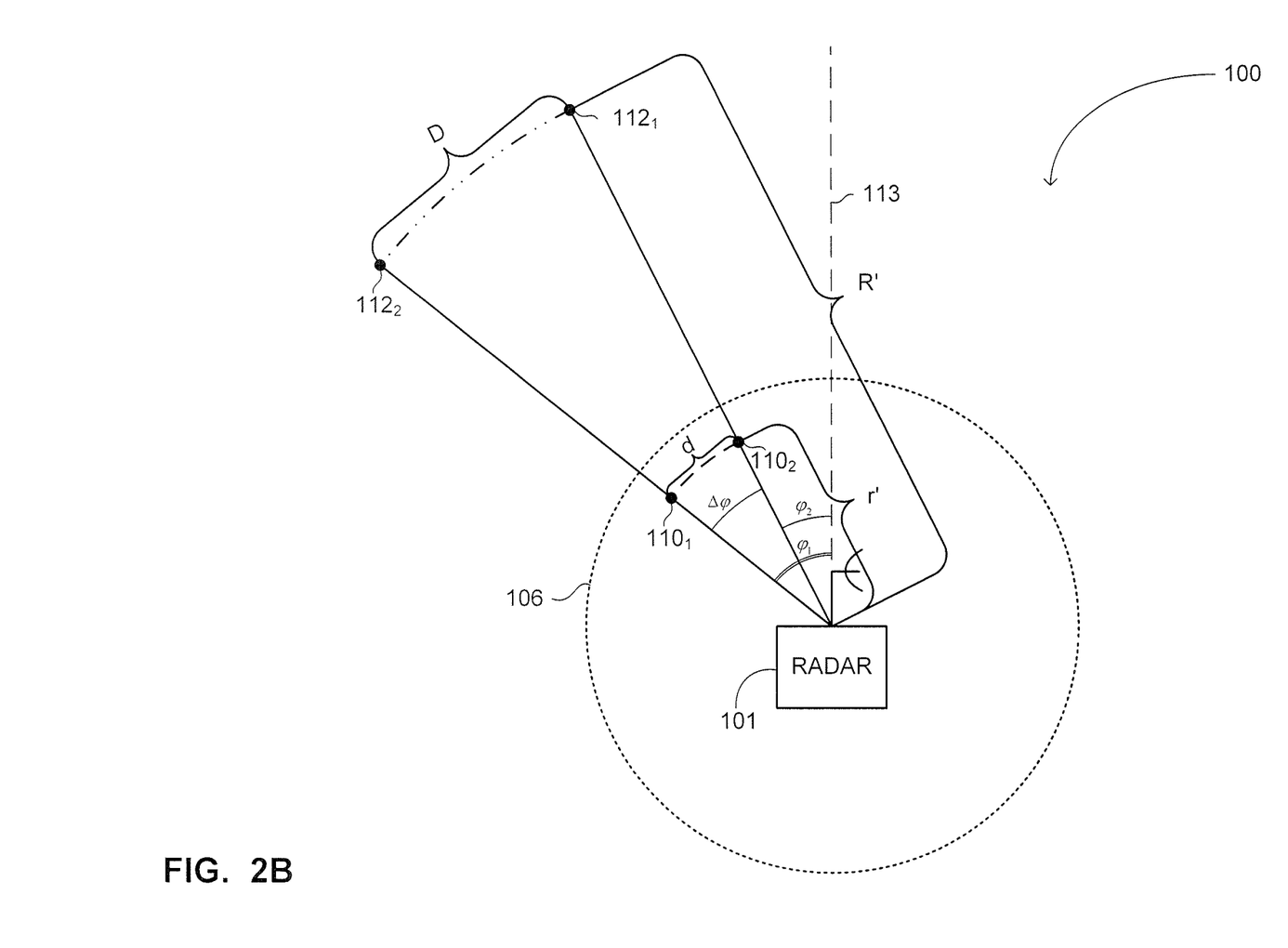
Figure 2C:
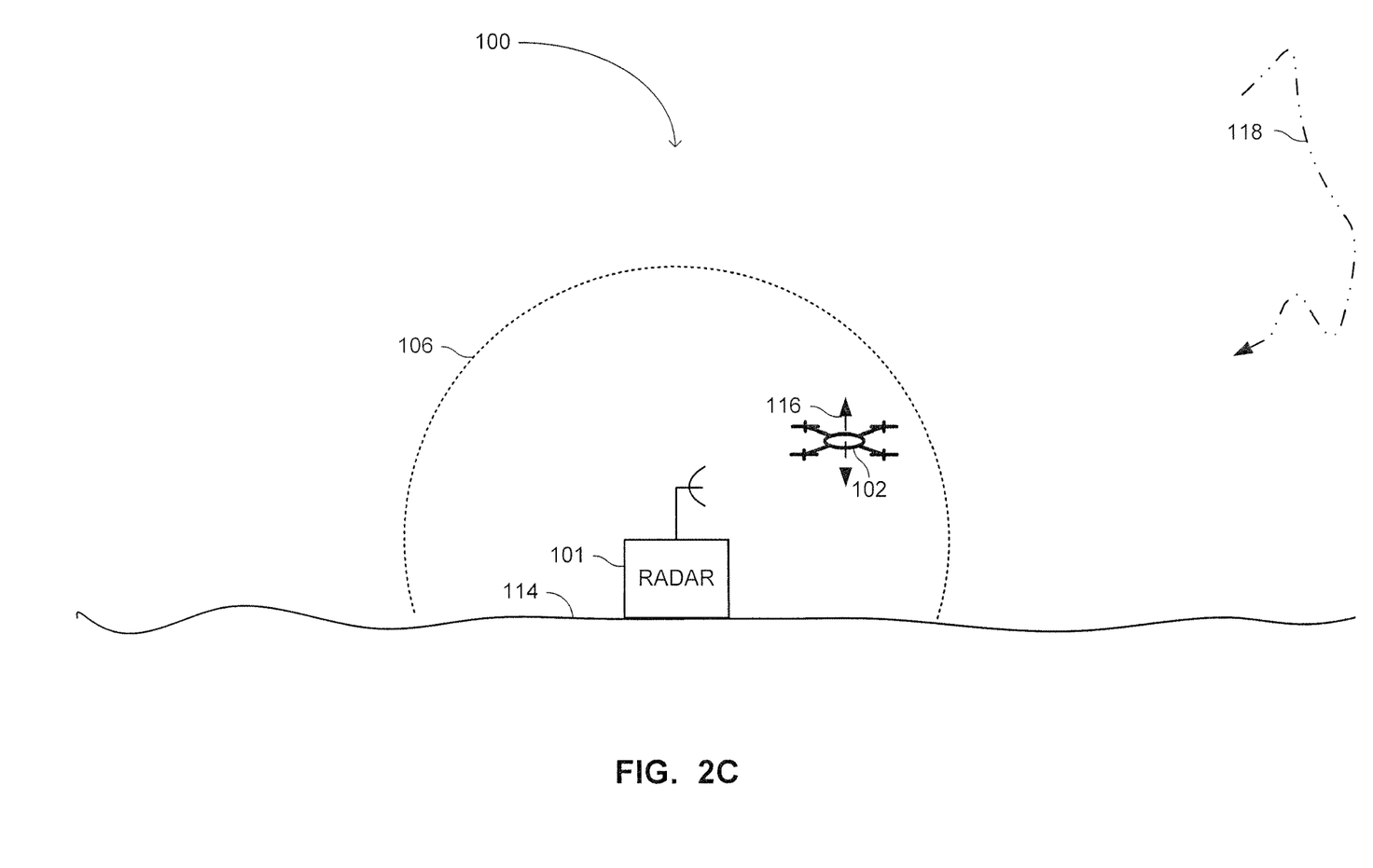
Figure 2D:
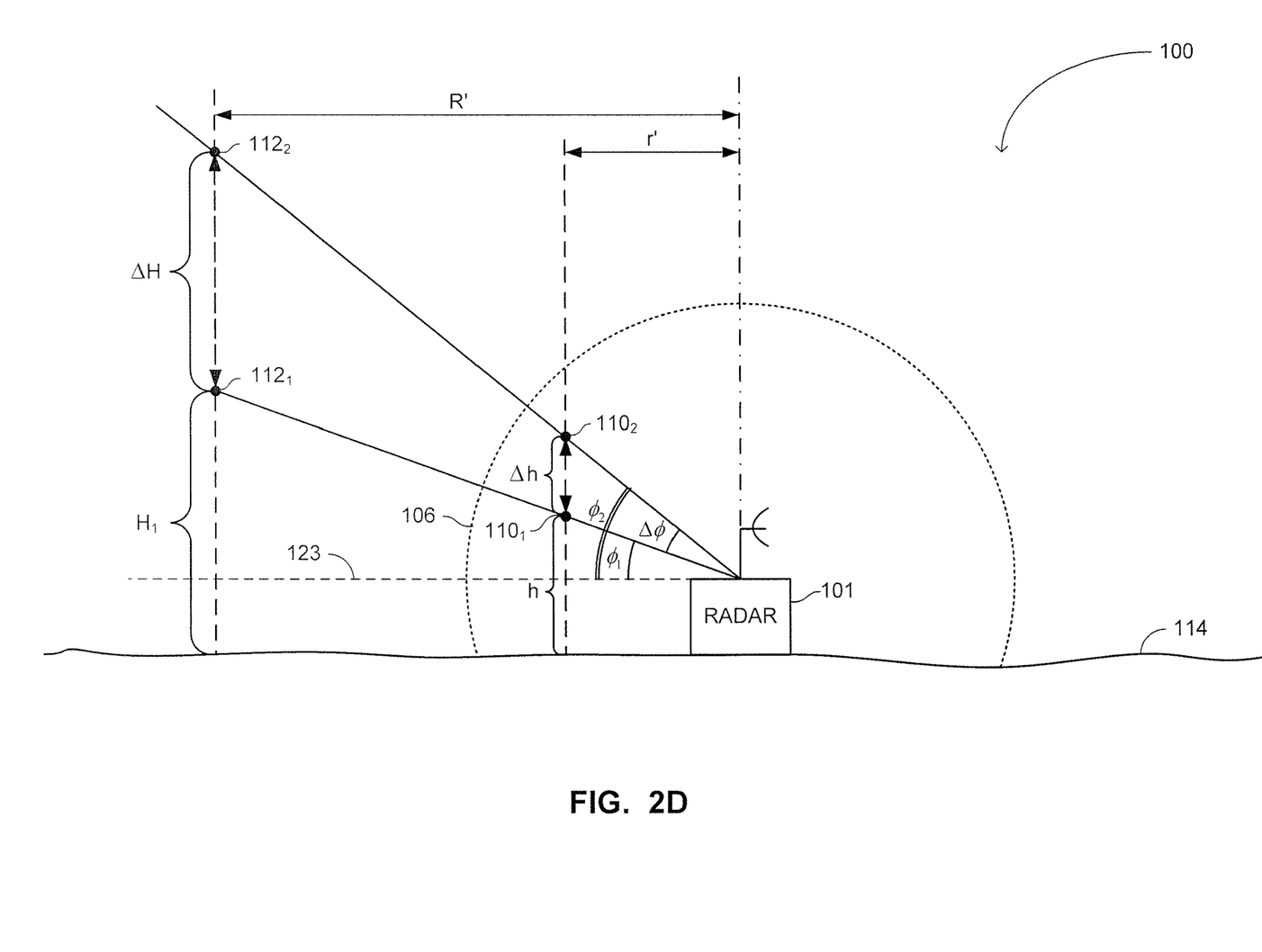

Reference is now made to FIGS. 2A-2D, which are schematic illustrations of a simulating vehicle trajectory, generally referenced 100, in accordance with an embodiment of the disclosed technique. The simulating vehicle trajectory in FIGS. 2A-2D simulate an actual trajectory 118 (i.e., the simulated trajectory) for training an operator of a radar 101 or for calibrating and testing radar 101. Radar 101 is located on the ground 114. Drone 102 is flying at a maneuvering distance from radar 101, which is smaller than the minimum detection range 106 of radar 101 (i.e., drone 102 is not detected by radar 101) according a simulating vehicle trajectory. FIGS. 2A and 2B depict an azimuthal simulation trajectory and FIGS. 2C and 2D depict an elevation simulation trajectory. To simulate a target at a simulated distance R, drone 102 receives a signal transmitted by radar 101, and re-transmits the received signal at a respective delay (i.e., according to the signal delay profile) and optionally with respective amplitude corresponding a simulated range and Doppler shift corresponding to the changes in the simulated range (i.e., both according to a signal characteristics profile), thereby simulating the actual distance and the change thereof of drone 102 from radar 101. Re-transmitting the received signal at respective amplitude simulates the attenuation the radar signal undergoes as it propagates through the medium toward the simulated target and back to radar 101 at the simulated distance. Re-transmitting the received signal with respective signal characteristics is also referred to herein as 'signal characterization'. According to the simulating vehicle trajectory, drone 102 maneuvers from point $110_1$ to point $110_2$. Radar 101 receives signals simulating a target maneuvering from point $112_1$ to point $112_2$, corresponding to points $110_1$ and $110_2$ respectively.

With reference to FIGS. 2A and 2B, a drone 102 is maneuvering according to an azimuthal simulation trajectory 104 around radar 101. As mentioned above, according to the simulating vehicle trajectory, drone 102 may maneuvers from a point $110_1$ to a point $110_2$. At point $110_1$ drone 102 is at an azimuthal angle $\varphi_1$ (i.e., relative to a reference direction 113) indicated by the double ark. At point 110₂ drone 102 is at an azimuthal angle $\varphi_2$. When drone 102 maneuvers from point 110₁ to point 110₂, drone 102 change the azimuth angle thereof by $\Delta\varphi$. The actual distance between point 110₁ and point 110₂ is d. Since drone 102 also employs signal delay and signal characterization to simulate distance and target characteristics, radar 101 receives signals simulating a target maneuvering from point 112₁ to point 112₂, corresponding to points 110₁ and 110₂ respectively. The distance between point 112₁ and point 112₂, is D.

With reference to FIGS. 2C and 2D, drone 102 is maneuvering according to an elevation simulation trajectory 116. At point 110₁ drone 102 is at an elevation angle of $\phi_1$. At point 110₂ drone 102 is at an elevation angle of $\phi_2$. When drone 102 maneuvers from point 110₁ to point 110₂, drone 102 change the elevation angle thereof by $\Delta\phi$. At point 110₁, the actual elevation, h, of drone 102, corresponds to an elevation angle of $\phi_1$ at distance r'. Since drone 102 also employs signal delay and signal characterization to simulate distance and target characteristics, radar 101 receives signals simulating a target at point 112₁ and elevation H. At point 110₂, the actual elevation h+Δh of drone 102 corresponding to an elevation angle of $\phi_2$ (indicated by the double arc) at distance r'. Since drone 102 also employs signal delay and signal characterization to simulate distance, radar 101 receives signals simulating a target at points 112₂ and elevation H+ΔH. In other words the change Δh in the elevation of drone 102 corresponds to a change ΔH in the elevation of the simulated target for a specific signal delay.

A simulating vehicle trajectory according to the disclosed technique simulates a trajectory of a target. The simulated trajectory of the target may be defined in terms of the azimuth of the target relative to a reference direction, the distance of the target from the radar and the elevation of the target above a reference plane. As a further example, the simulated trajectory may be defined by a set of coordinates in a reference coordinate system. According to yet another example, the simulated trajectory may be defined as a set of accelerations and directions relative to a start position in a reference coordinate system. The reference coordinate system may be a global coordinate system (e.g., WSG 84, ETRS89) or a local coordinate system, for example, a coordinate system defined by the radar location and a reference direction (e.g., the location of the radar is defined as the [0;0;0] location and the reference direction defines one of the axis of the coordinate system).

As mentioned above, the simulating vehicle trajectory is defined according to a simulation profile. The simulation profile at least includes a spatial simulation profile and delay simulation profile. The simulation profile may further include a signal characteristics profile (e.g., signal amplitude, Doppler shift profile). The spatial simulation profile may define list of coordinates and elevations or a list of location and elevation changes in the reference coordinate system. As mentioned above, the spatial simulation profile may alternatively include at least one of an azimuth simulation profile and an elevation simulation profile. The azimuth simulation profile defines an azimuthal trajectory for the simulating vehicle. The elevation simulation profile defines an elevation trajectory for the simulating vehicle. Signal delay profile defines the duration that transceiver of the simulating vehicle should delay the signal re-transmission and the signal. The signal characteristics profile defines the signal characteristics of the re-transmitted signal. The simulating vehicle maneuvers according to the azimuth and elevation simulation profiles and delays the re-transmission of the received signal according to the signal delay profile, thus maneuvering according to the simulating vehicle trajectory and simulating the target trajectory.

Figure 3A:
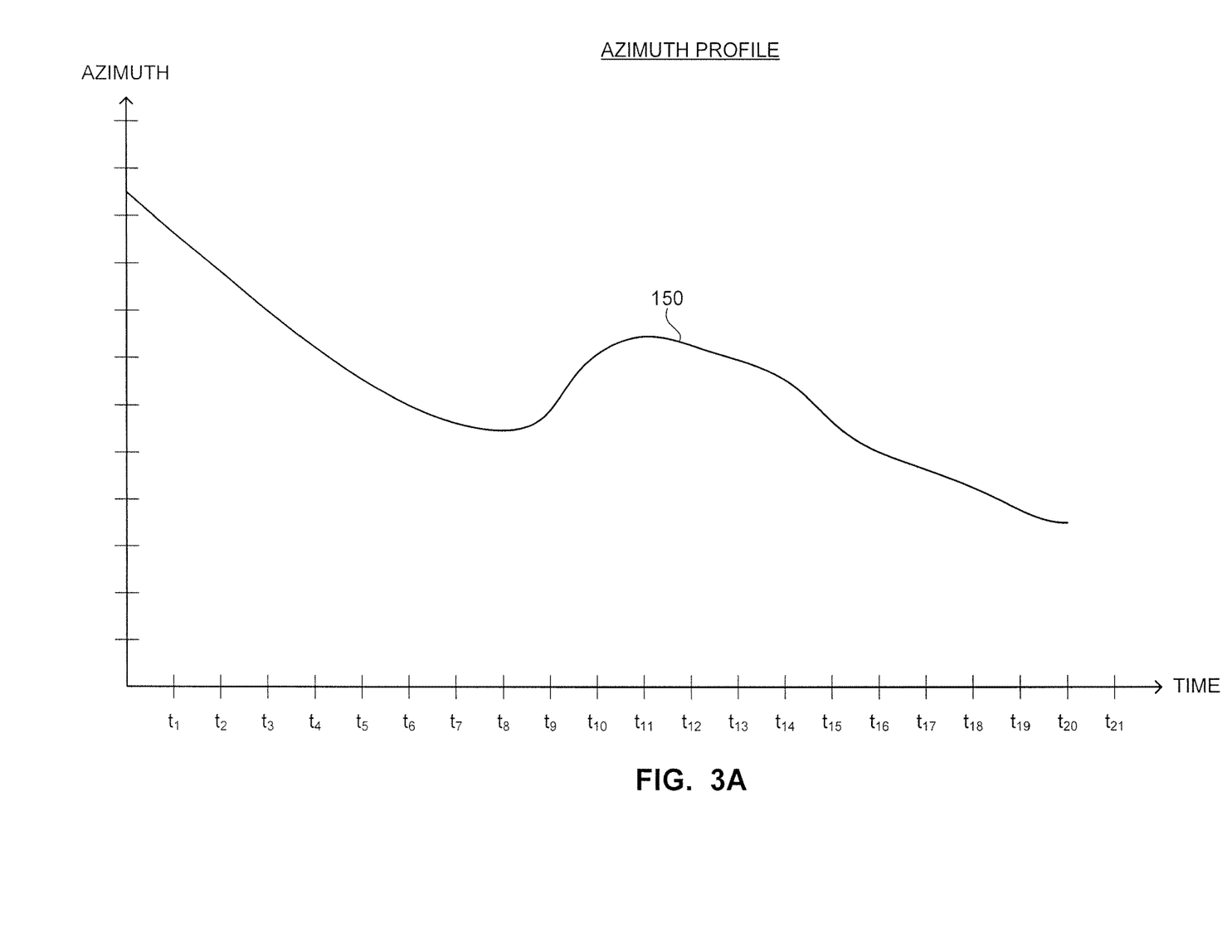
FIGS. 3A-3D, which are schematic illustrations of an exemplary azimuth simulation profile, an exemplary elevation simulation profile, an exemplary signal delay profile and an exemplary signal characteristics profile, all in accordance with another embodiment of the disclosed technique.
Figure 3B:
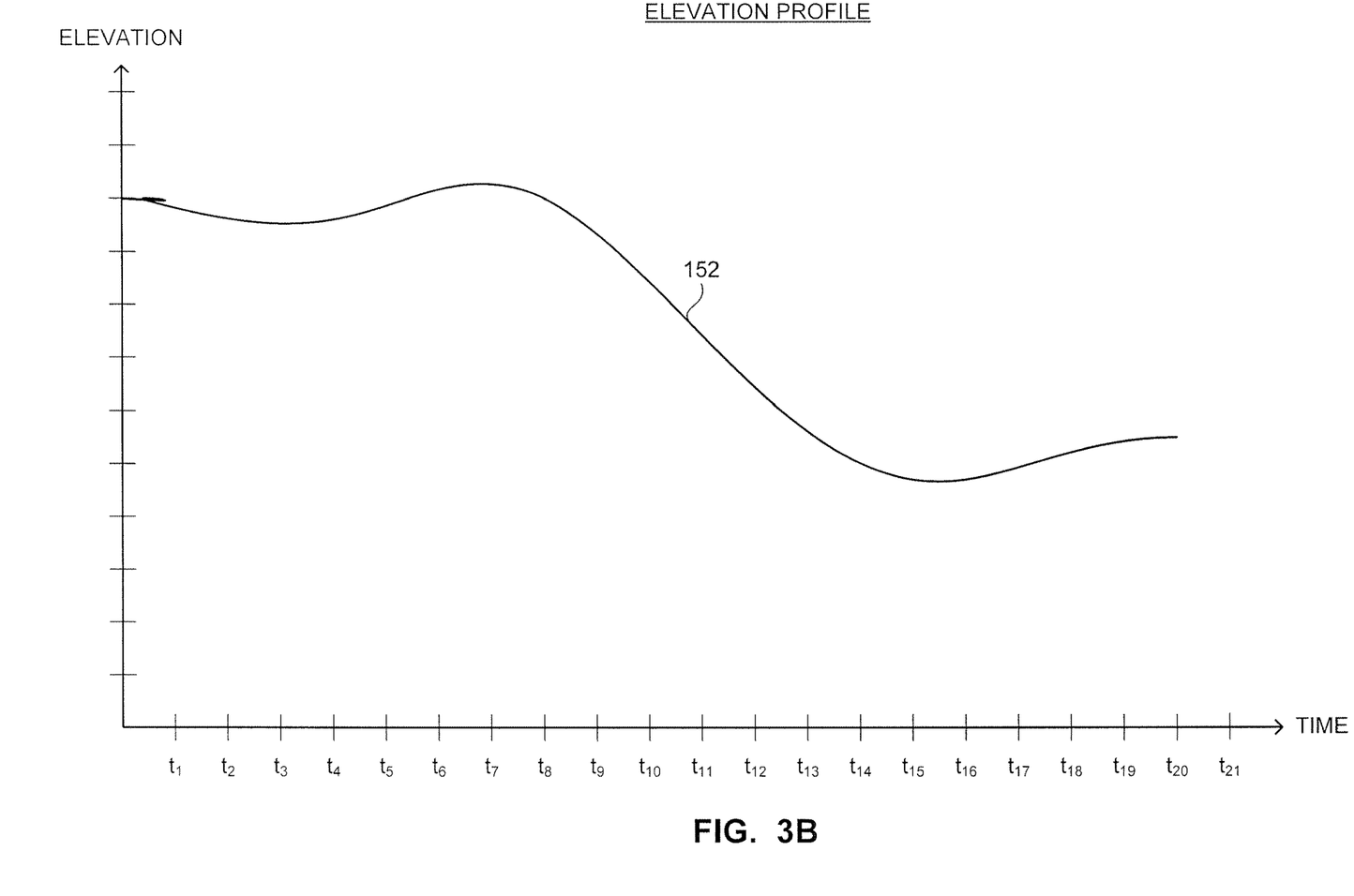
Figure 3C:
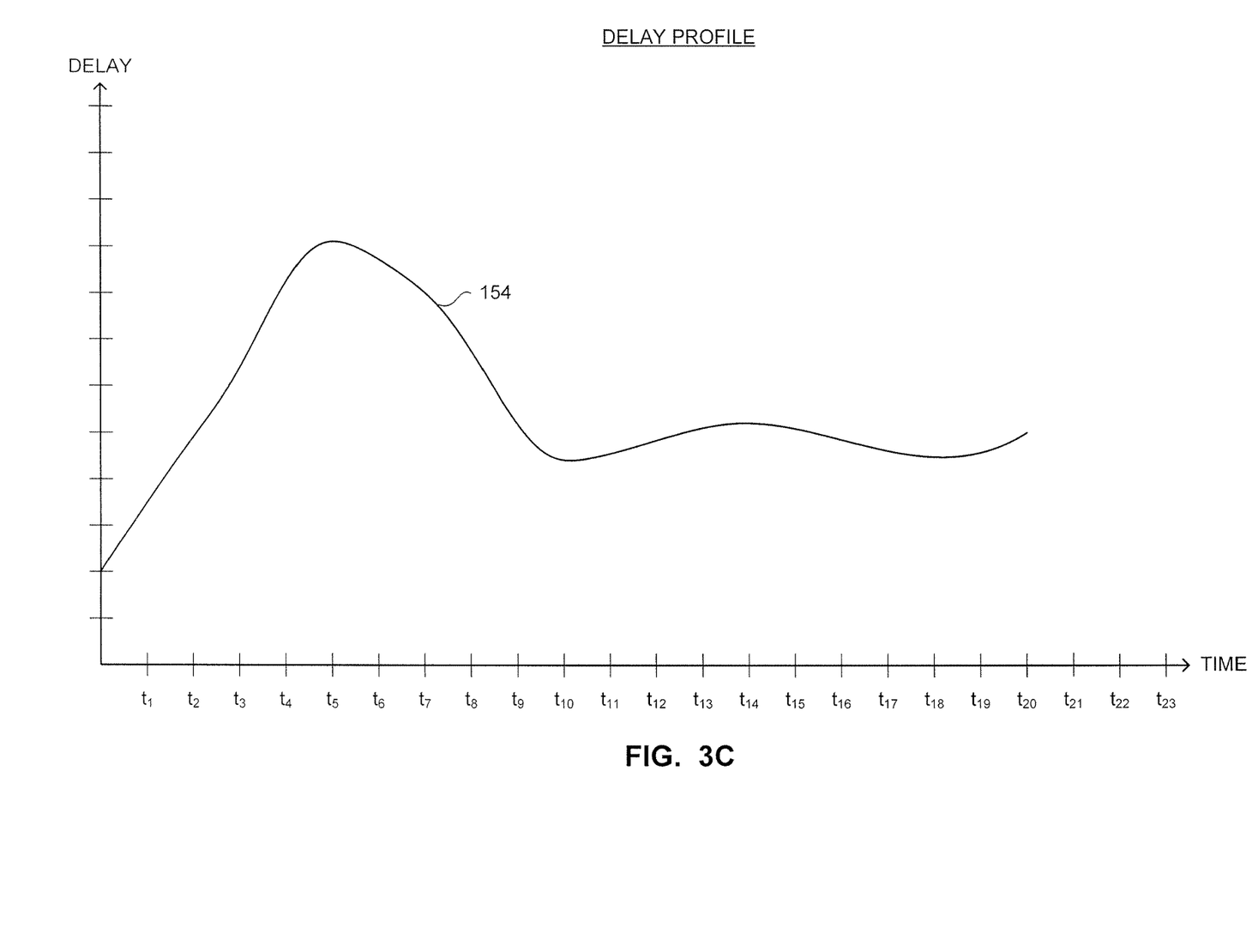

To determine the simulation profile, the maneuvering distance of the simulating vehicle (e.g., a drone) from the radar is determined. For example, the maneuvering distance of the simulating vehicle may be determined to be at a range from the radar, smaller than the minimum detection range of the radar. Referring back to FIGS. 2B and 2D, the maneuvering distance is denoted r'. Reference is now made to FIGS. 3A-3C, which are schematic illustrations of an exemplary azimuth simulation profile generally referenced 150, an exemplary elevation simulation profile generally referenced 152, an exemplary signal delay profile 154 and an exemplary signal characteristics profile generally reference 155, all in accordance with another embodiment of the disclosed technique. With reference to FIG. 3A, azimuth simulation profile 150 defines the simulation azimuthal trajectory (i.e., the azimuths of the simulating vehicle over time). The azimuths defined by azimuth simulation profile 150 correspond to the azimuths of the simulated trajectory. Thus, these azimuths also define the azimuths of the simulating vehicle, when maneuvering according to the simulation profile. According to another example, the azimuth simulation profile may define the locations of the simulating vehicle in a reference coordinate system, over time. These locations are determined, for example, according to the location of the radar in the reference coordinate system, the azimuths (i.e., relative to a reference direction) and the maneuvering distance of the simulating vehicle from the radar. It is noted that the derivative of the azimuth simulation profile defines the rotational velocity of the simulating vehicle around the radar (e.g., with reference to FIG. 2A, the rotational velocity of simulating vehicle 102 around radar 101 on azimuthal simulation trajectory 104).

With reference to FIG. 3B, elevation simulation profile 152 defines the simulation elevation trajectory (i.e., the elevations of the simulating vehicle over time). To determine the elevation simulation profile, the elevation angles of the simulated trajectory are determined according the elevations and distances of the simulated trajectory (e.g., by employing known trigonometric identities). From these elevation angels and maneuvering distance, the elevations of the simulating vehicle, when maneuvering according to the simulation profile, are determined.

With reference to FIG. 3C, signal delay profile 154 defines the durations the drone should delay the received radar signal before re-transmitting, over time. The distances of the simulated target are determined according to the difference between the actual distance of the simulating vehicle and the simulated distance from the radar. The actual distance of the simulating vehicle is determined according to the maneuvering distance and the actual elevations. The difference between the actual distance of the simulating vehicle and the simulated distance from the radar, and the propagation speed of the signal in the medium, define the delays that the drone should delay the received radar signal before re-transmitting. Signal delay profile 154 is determined according to these delays.

Figure 3D:
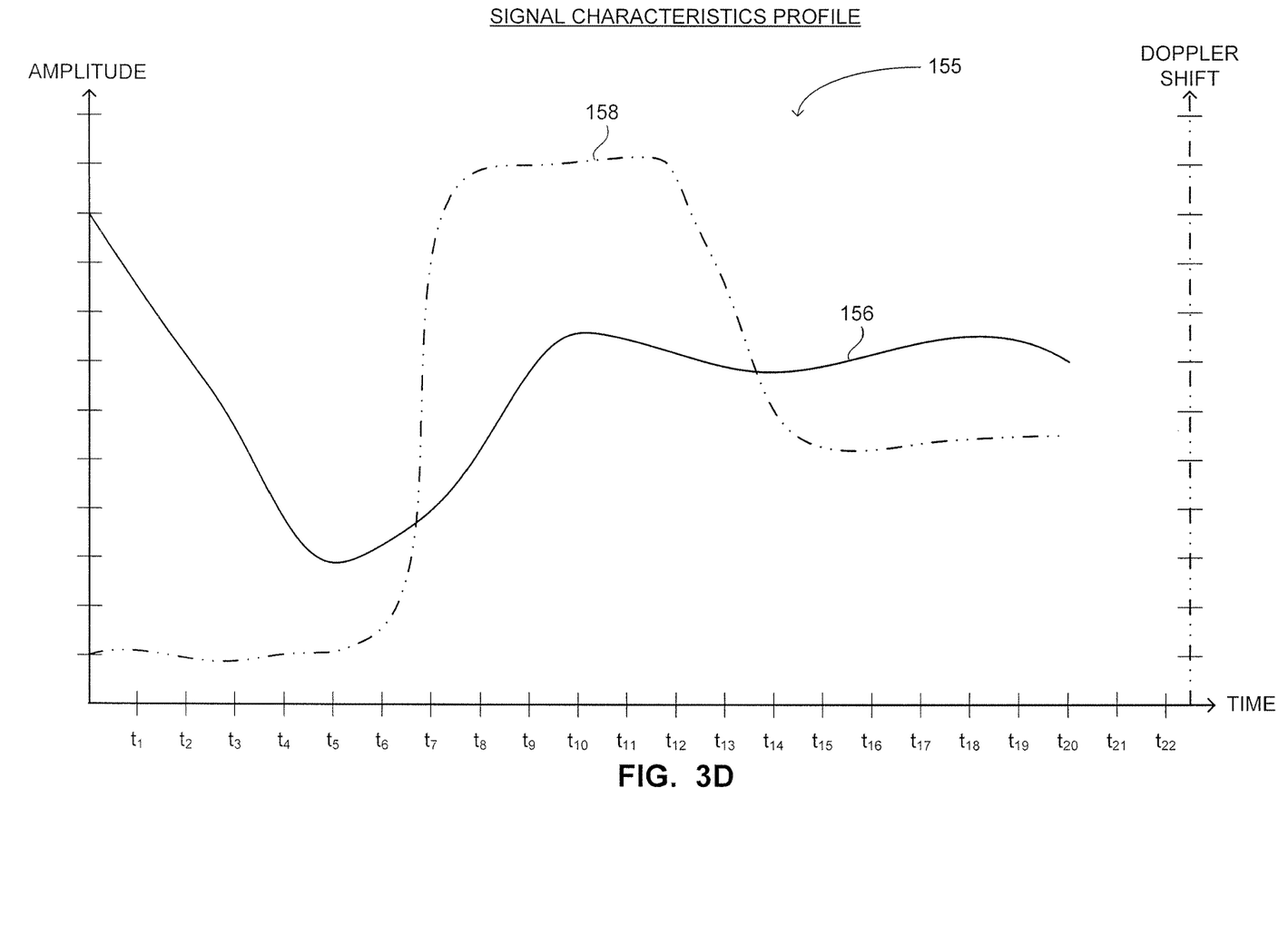

With reference to FIG. 3D, signal characteristics profile 155 is exemplified with an amplitude profile 156 (depicted with a solid line) and a Doppler shift profile 158 (depicted with a dashed doubled-dotted line), which defines the amplitudes at which the drone re-transmits the received radar signal over time. The amplitudes of the re-transmitted signal simulates the attenuation the signal undergoes in the medium when propagating toward the simulated target and back to the radar. The amplitude of the re-transmitted signal may also simulate losses due to transmitter imperfections, Free Space Path Loss (FSPL) or wave dispersion. The amplitude of the re-transmitted signal may further simulate effects that specific target characteristics such as Radar Cross Section may have on the amplitude of the signal received by the radar. Doppler shift profile 158 defines the Doppler shift in the frequency of the re-transmitted signal, caused by change in the simulated distance from the radar. In general, the Doppler shift is related to the rate of change (i.e., derivative) of the range the simulated target from the radar. However, since the signal delay is proportional to this simulated distance, the Doppler shift is related to the rate of change of the signal delay as well.

Figure 4:
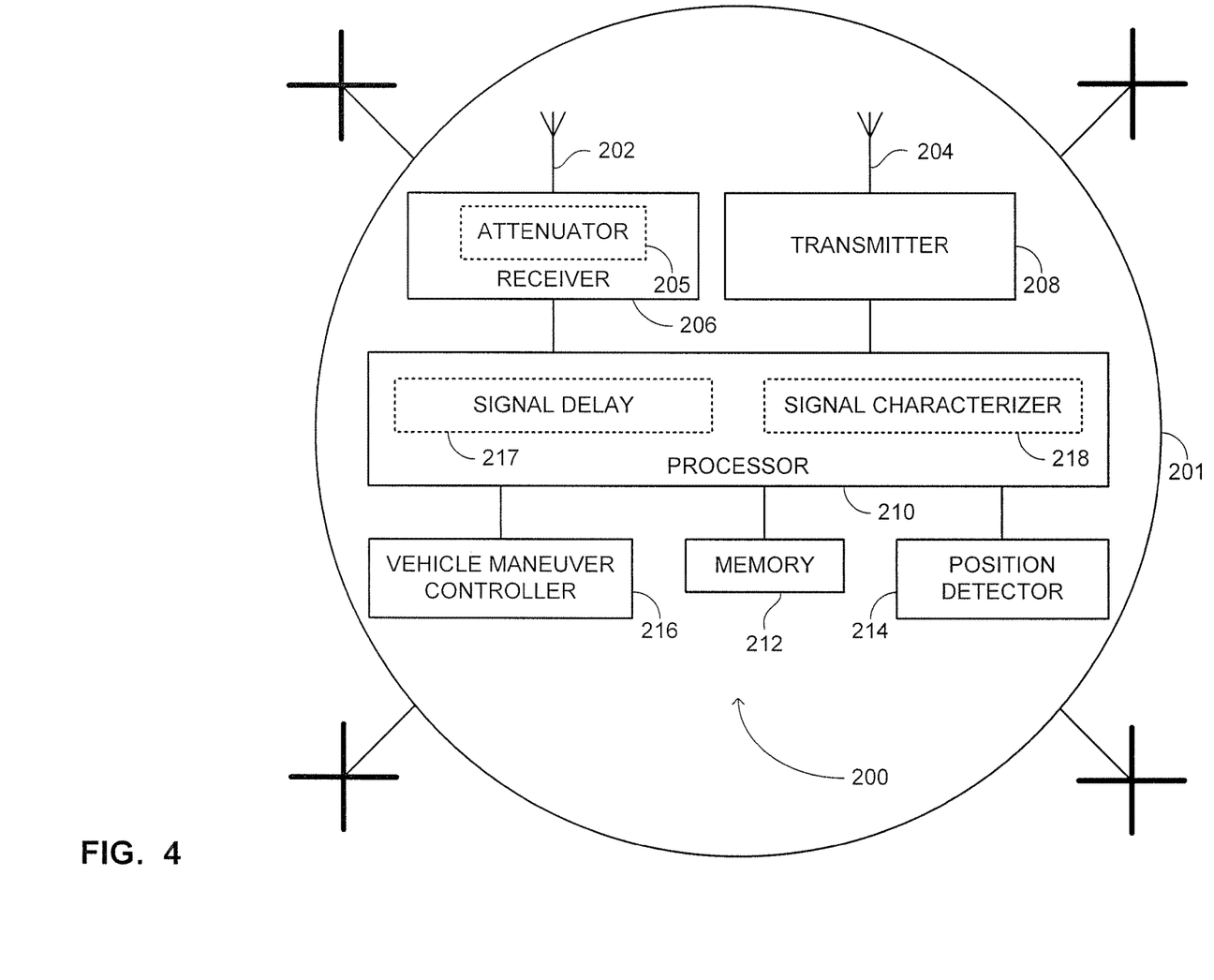
FIG. 4, which is a schematic illustration of a system for simulating a trajectory of radar target, constructed and operative in accordance with a further embodiment of the disclosed technique.

Reference is now made to FIG. 4, which is a schematic illustration of a system, generally referenced 200, for simulating a trajectory of radar target, constructed and operative in accordance with a further embodiment of the disclosed technique. System 200 is located on a simulating vehicle 201 such as a drone 201. System 200 includes a receiving transducer 202, a transmitting transducer 204, a receiver 206, a transmitter 208, a processor 210, a memory 212, a position detector 214 and a vehicle maneuver controller 216. Processor 210 includes a signal delay 217 and a signal characterizer 218. Receiver 206 optionally includes an attenuator 205. Processor 210 is coupled with receiver 206, with transmitter 208 with memory 212 with position detector 214 and with vehicle maneuver controller 216. Receiver 206 is further coupled with receiving transducer 202. Transmitter 208 is further coupled with transmitting transducer 204.

Receiving transducer 202 may be an RF transducers (i.e., an antenna) an optical transducers (e.g., a photodiode, a Light Dependent Resistor—LDR and the like) or a sonic transducer (e.g., piezo electric transducer, a capacitive transducer, magnetorestrictive transducers and the like), corresponding to the type of signal employed by the radar. Similarly transmitting transducer 204 may be an RF transducers an optical transducers or a sonic transducer, corresponding to the type of signal employed by the radar. Processor 210 may be a general purpose processor, a Digital Signal Processor or a special purpose processor implemented with Field Programmable Gate Arrays (FPGA) or Application Specific Integrated Circuit (ASIC) or with discrete components. Position detector 214 is for example a Global Positioning System (GPS) receiver determining the location of system 200 in a reference coordinate system (e.g., WSG 84, ETRS89, or a coordinate system defined by the radar location and a reference direction). Position detector may alternatively or additionally include an Inertial Measurement Unit (IMU) that measures the linear and angular accelerations of simulating vehicle 201 thus providing information relating to the location and orientation of simulating vehicle 201 relative to a reference location and orientation. Position detector 214 may also be a receiver receiving information relating to the position (i.e., location and orientation) of simulating vehicle 201 from a remote station and providing this information to processor 210 (e.g., according to a standard navigational data transmission protocol such as NMEA 0183 or UBX). Memory 212 at least stores the azimuth simulation profile, the elevation simulation profile and the signal characteristics profile corresponding to the simulated trajectory.

Receiving transducer 202 receives a signal from the radar and transforms this received signal to an electric received signal. Receiving transducer 202 provides the electric received signal to receiver 206. Receiver 206 at least samples the electric received signal to produce a sampled received signal. Receiver 206 may further filter the electric down convert and demodulate the electric received signal. Receiver 206 provides the sampled received signal to processor 210. When the radar employs RF signals (i.e., an RF radar) or sonic signals (i.e., a sonic radar) receiver 206 includes attenuator 205, which attenuates the signals received from receiving transducer 202. When simulating vehicle 201 operates at ranges from the radar which is smaller than the radar minimum detection range, system 200 may receive the side lobes produced by the radar as well as the main lobe. Attenuator 205 attenuates the signals received by receiving transducer 202 such that receiver 206 samples only electric received signals corresponding to the main lobe of the radar (i.e., otherwise, it might be difficult to determine the time of arrival of a signal received from the main lobe of the radar and thus difficult to determine when to re-transmit the radar signal).

Processor 210 produces a re-transmission signal according to signal delay profile and optionally according to the signal characteristics profile. The re-transmission signal exhibits, for example, the amplitude defined by the signal characteristics profile (i.e., when the signal characteristics profile include an amplitude profile). Processor 210 provides the re-transmission signal to transmitter 208 at a delay corresponding to the delay defined by the signal delay profile, relative to the time of arrival of the signal. Transmitter 208 converts the re-transmission signal to an analog signal and optionally amplifies and filters the analog signal and provides the analog signal to transmitting transducer 208. Transmitting transducer transforms the analog signal into a transmitted signal, the transmitted signal being in the signal type employed by the radar (e.g., an RF signal, a light signal or a sonic signal).

Furthermore, processor 210 employs the spatial simulation profile to determine the motion characteristics of simulating vehicle 201. The motion characteristics at least include direction of motion and acceleration for simulating vehicle 201. To that end, processor 210 receives the current position of simulating vehicle 201 from position detector 214 and determines the required motion characteristics for simulating vehicle 201 to comply with the spatial simulation profile. Processor 210 provides the required motion characteristics to vehicle maneuvering controller 216. Vehicle maneuvering controller 216 determines the required motion control commands to the vehicle maneuvering system. For example, when simulating vehicle 201 is a quadcopter, vehicle maneuvering controller 216 determines the required rotational velocities or each rotor required to achieve the required motion characteristics. As a further example, when simulating vehicle is a remote control car, vehicle maneuvering controller 216 determines the requires steering angle and motor revolutions rate to achieve the required motion characteristics.

Figure 5:
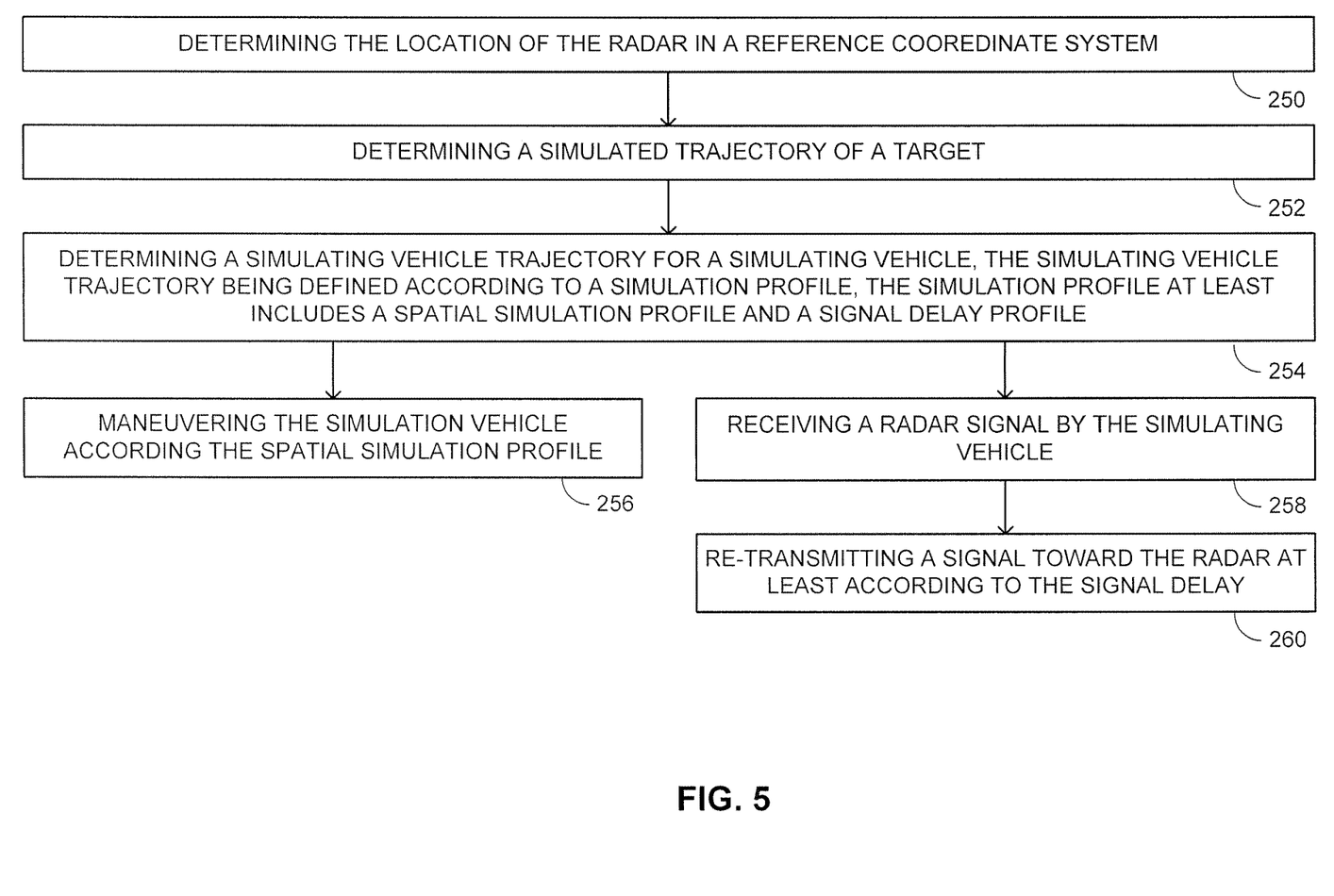
FIG. 5, which is a schematic illustration of a method for simulating a trajectory of radar target, operative in accordance with another embodiment of the disclosed technique.

Reference is now made to FIG. 5, which is a schematic illustration of a method for simulating a trajectory of radar target, operative in accordance with another embodiment of the disclosed technique. In procedure 250, the location of the radar in a reference coordinate system is determined. The reference coordinate system is, for example, WSG 84, ETRS89 or a coordinate system defined by the radar location and a reference direction.

In procedure 252, a simulated trajectory of a target is determined. This simulated target trajectory is the trajectory which is to be simulated by the simulating vehicle. The simulated trajectory may be defined in terms of the azimuth of the target relative to a reference direction, the distance of the target from the radar and the elevation of the target above a reference plane. As a further example, the simulated trajectory may be defined by a set of coordinates in the reference coordinate system. According to yet another example, the simulated trajectory may be defined as a set of accelerations and directions relative to a start position in the reference coordinate system.

In procedure 254, a simulating vehicle trajectory is determined for a simulating vehicle. The simulating vehicle trajectory is defined according to a simulation profile. The simulation profile includes a spatial simulation profile and a signal delay profile. The simulation profile may further include a signal characteristics profile (e.g., an amplitude profile). The spatial simulation profile may define list of coordinates and elevations or a list of location and elevation changes in the reference coordinate system. As mentioned above, the spatial simulation profile may alternatively include at least one of an azimuth simulation profile and an elevation simulation profile. The azimuth simulation profile defines an azimuthal trajectory for the simulating vehicle. The elevation simulation profile defines an elevation trajectory for the simulating vehicle. Signal delay profile defines the duration that transceiver of the simulating vehicle should delay the signal re-transmission and the signal. Signal characteristics profile define the signal characteristics of the re-transmitted signal. From procedure 252, the method proceeds to procedures 254 and 256.

In procedure 256, the simulating vehicle is maneuvered according the spatial simulation profile. Maneuvering the simulating vehicle according to the spatial simulation profile includes determining the motion characteristics of the simulating vehicle and determining motion control commands to the simulating vehicle. With reference to FIG. 4, processor 210 determines the motion characteristics of the simulating vehicle according to the spatial simulation profile. Processor 210 provides these motion characteristics to vehicle maneuvering controller which determines the motion control commands to the vehicle maneuvering system.

In procedure 258, a radar signal is received by the simulating vehicle. With reference to FIG. 4 receiving transducer 202 receives a radar signal, transforms the received into an electric received signal and provides the electric received signal to receiver 206. Receiver 206 at least samples the electric received signal and provides the electric received signal to processor 210.

In procedure 260, a signal is re-transmitted toward the radar at least according to the signal delay profile and optionally according to the signal characteristics profile. Accordingly, the simulating vehicle delays the transmission of the re-transmitted signal according to the signal delay profile. As described above, the simulation profile may further include a signal characteristics (e.g., amplitudes) profile. The simulating vehicle may further characterize the re-transmitted signal according to the signal characteristics profile. With reference to FIG. 4, processor 210 produces a re-transmission signal according to the signal characteristics profile and provides the re-transmission signal to transmitter 208 at a delay corresponding to the delay defined by the signal delay profile, relative to the time of arrival of the signal. Transmitter 208 converts the re-transmission signal to an analog signal provides the analog signal to transmitting transducer 208 which transforms the analog signal into the signal type employed by the radar.

It will be appreciated by persons skilled in the art that the disclosed technique is not limited to what has been particularly shown and described hereinabove. Rather the scope of the disclosed technique is defined only by the claims, which follow.

The invention claimed is:

1. A method for simulating a simulated radar target for a radar, said simulated radar target moving along a simulated trajectory, the method comprising the procedures of:
   determining said simulated trajectory of said simulated radar target;
   determining a simulating vehicle trajectory for a simulating vehicle, said simulating vehicle trajectory being defined in space according to a simulation profile, said simulation profile corresponding to said simulated trajectory of said simulated radar target, said simulation profile at least including a spatial simulation profile and a signal delay profile, said spatial simulation profile including an azimuth simulation profile and an elevation simulation profile;
   maneuvering said simulating vehicle in space according to said spatial simulation profile;
   receiving by said simulating vehicle, a radar signal from said radar; and
   re-transmitting by said simulating vehicle, a signal toward said radar at least according to said signal delay profile:
   wherein said simulating vehicle trajectory is at a range from said radar smaller than a radar minimum detection range.

2. The method according to claim 1, further including the preliminary procedure of determining the location of said radar in a reference coordinate system.

3. The method according to claim 1, wherein said maneuvering said simulating vehicle according to said spatial simulation profile includes determining motion characteristics of said simulating vehicle and determining motion control commands to said simulating vehicle.

4. The method according to claim 1, wherein said simulation profile further comprises a signal characteristics profile,
   wherein said re-transmitted signal is further characterized according to said signal characteristics profile;
   wherein said signal characteristics profile includes at least one of:
   an amplitude profile which defines the amplitude of said re-transmitted signal; and
   a Doppler shift profile, which defines a Doppler shift of the frequency in the re-transmitted signal.

5. The method according to claim 1, wherein said azimuth simulation profile defines locations of said simulating vehicle, in a reference coordinate system over time;
   wherein said elevation simulation profile defines elevations of said simulating vehicle over time;
   wherein said signal delay profile defines durations the received radar signal is delayed before re-transmitting, over time.

6. The method according to claim 1, wherein said simulating vehicle is an un-manned vehicle selected from a group consisting of:
   a drone;
   a remote control boat; and
   a remote control vehicle.

7. The method according to claim 1, wherein said spatial simulation profile includes one of:
   a list of coordinates and elevation of said simulating vehicle in a referenced coordinate system; and
   a list of coordinates and elevation changes of said simulating vehicle in a referenced coordinate system.

8. A system for simulating a simulated radar target for a radar, said simulated radar target moving along a simulated trajectory, the system comprising:

a simulating vehicle including:

a receiving transducer, receiving a signal from said radar and transforming the received signal to an electric received signal;

a receiver, coupled with said receiving transducer, said receiver receiving said electric received signal and at least sampling said electric received signal to produce a sampled received signal;

a position detector, for determining a current position of said simulating vehicle;

a transmitter, converting a re-transmission signal to an analog signal;

a transmitting transducer, coupled with said transmitter, for transforming said analog signal into a transmitted signal; and a processor, coupled with said receiver, with said transmitter and with said position detector, said processor at least including a signal delay, said processor employing a simulation profile corresponding to said simulated trajectory of said simulated radar target, said simulation profile defining a trajectory of said simulating vehicle and at least including a spatial simulation profile and a signal delay profile, said spatial simulation profile including an azimuth simulation profile and an elevation simulation profile, said processor receiving said sampled received signal and producing said re-transmission signal at a delay defined by said signal delay profile, said processor further determining motion characteristics of said simulating vehicle in space according to said spatial simulation profile and said current position of said simulating vehicle;

wherein said simulating vehicle trajectory is at a range from said radar smaller than a radar minimum detection range.

9. The system according to claim 8, further comprising a vehicle maneuver controller, coupled with said processor, for determining motion control commands to the vehicle maneuvering controller according to said motion characteristics.

10. The system according to claim 8, wherein said processor further comprises a signal characterizer for characterizing said re-transmitted signal according to a signal characteristics profile;

wherein signal characteristics profile includes at least one of:
an amplitude profile which defines amplitude of said re-transmitted signal; and
a Doppler shift profile, which defines a Doppler shift in the frequency of the re-transmitted signal.

11. The system according to claim 8, wherein said azimuth simulation profile defines locations of the simulating vehicle in a reference coordinate system, over time;

wherein said elevation simulation profile defines elevations of said simulating vehicle over time;

wherein said signal delay profile defines durations the received radar signal is delayed before re-transmitting, over time.

12. The system according to claim 8, wherein said receiver comprises an attenuator that attenuates the signals received from said receiving transducer.

13. The system according to claim 8, wherein said simulating vehicle is an un-manned vehicle selected from the group consisting of:
a drone;
a remote control boat; and
a remote control vehicle.

14. The system according to claim 8, wherein said spatial simulation profile includes one of:
a list of coordinates and elevation of said simulating vehicle in a referenced coordinate system; and
a list of coordinates and elevation changes of said simulating vehicle in a referenced coordinate system.

* * * * *